(12) United States Patent
Doudement et al.

(10) Patent No.: US 10,150,624 B2
(45) Date of Patent: Dec. 11, 2018

(54) DEVICE FOR ALIGNING AND RIGHTING PREFORMS, COMPRISING A BOWL CENTRIFUGE EQUIPPED WITH MEANS FOR EJECTING MISALIGNED PREFORMS

(71) Applicant: SIDEL PARTICIPATIONS, Octeville-sur-mer (FR)

(72) Inventors: Denis Doudement, Octeville-sur-mer (FR); Anthony Debris, Octeville-sur-mer (FR); Frederic Willig, Octeville-sur-mer (FR); Eric Mazo, Octeville-sur-mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/564,128

(22) PCT Filed: Apr. 7, 2016

(86) PCT No.: PCT/FR2016/050794
§ 371 (c)(1),
(2) Date: Oct. 3, 2017

(87) PCT Pub. No.: WO2016/166446
PCT Pub. Date: Oct. 20, 2016

(65) Prior Publication Data
US 2018/0079599 A1    Mar. 22, 2018

(30) Foreign Application Priority Data
Apr. 16, 2015  (FR) ...................... 15 53374

(51) Int. Cl.
*B65G 47/16*    (2006.01)
*B65G 47/14*    (2006.01)
(Continued)

(52) U.S. Cl.
CPC ...... *B65G 47/1464* (2013.01); *B29C 49/4205* (2013.01); *B65G 47/256* (2013.01);
(Continued)

(58) Field of Classification Search
CPC ....................... B65G 47/1457; B65G 47/1464
(Continued)

(56) References Cited

U.S. PATENT DOCUMENTS 3,282,464 A * 11/1966 Kohl .................... A23G 7/0037
                                                  198/383
3,599,829 A *  8/1971 Aidlin ................ B65G 47/1428
                                                  198/380
(Continued)

FOREIGN PATENT DOCUMENTS

EP    1 335 870 A1    8/2003
EP    2 048 097 A1    4/2009
(Continued)

OTHER PUBLICATIONS

International Search Report, dated Jun. 15, 2016, from corresponding PCT application No. PCT/FR2016/050794.

*Primary Examiner* — Joseph A Dillon, Jr.
(74) *Attorney, Agent, or Firm* — Young & Thompson

(57) ABSTRACT

Disclosed is a device for aligning preforms in a row and righting same, the device including a bowl centrifuge formed by: a horizontal circular platen rotating about a vertical axis; a fixed peripheral rail; at least a first angular sector for aligning the preforms against the rail; and at least a second angular sector for righting the preforms. The device includes a unit for actively ejecting incorrectly aligned preforms from the row of correctly aligned and righted preforms.

20 Claims, 4 Drawing Sheets

(51) Int. Cl.
    *B65G 47/256*     (2006.01)
    *B29C 49/42*     (2006.01)
    *B29C 49/06*     (2006.01)
    *B29K 67/00*     (2006.01)
    *B29L 31/00*     (2006.01)
    *B65D 1/02*     (2006.01)

(52) U.S. Cl.
    CPC ...... *B29C 49/06* (2013.01); *B29C 2049/4231* (2013.01); *B29K 2067/003* (2013.01); *B29L 2031/7158* (2013.01); *B65D 1/0223* (2013.01); *B65G 2201/0244* (2013.01)

(58) Field of Classification Search
    USPC .................................................. 198/389, 394
    See application file for complete search history.

(56) References Cited

U.S. PATENT DOCUMENTS

| | | | | |
|---|---|---|---|---|
| 3,622,039 A * | 11/1971 | Lindstrom | ............. | B23P 19/08 221/10 |
| 3,658,207 A * | 4/1972 | Schultz | ............. | B65G 47/1464 198/382 |
| 3,684,129 A * | 8/1972 | Loy | ............. | B65G 47/1457 221/167 |
| 3,774,806 A * | 11/1973 | Swart | ............. | B65G 47/1428 198/389 |
| 3,815,782 A * | 6/1974 | Miller | ............. | B65G 47/1457 198/392 |
| 4,244,459 A * | 1/1981 | Garrett | ............. | B65G 47/1492 198/389 |
| 4,266,653 A * | 5/1981 | Mergl | ............. | B65B 7/2821 198/392 |
| 4,401,203 A * | 8/1983 | McDonald | ............. | B65G 47/1457 198/392 |
| 4,429,808 A * | 2/1984 | Doty | ............. | B65G 47/1457 198/392 |
| 4,610,345 A * | 9/1986 | Spreen | ............. | B65G 47/1457 198/392 |
| 4,709,798 A * | 12/1987 | Herzog | ............. | B65G 47/1407 198/380 |
| 4,825,995 A * | 5/1989 | Nalbach | ............. | B65G 47/1457 198/380 |
| 5,031,748 A * | 7/1991 | Bianchini | ............. | B65B 7/2807 198/380 |
| 5,044,487 A * | 9/1991 | Spatafora | ............. | B65G 47/1457 198/392 |
| 5,050,722 A * | 9/1991 | Beswick | ............. | B67B 1/005 198/392 |
| 5,238,124 A * | 8/1993 | Cane | ............. | A61J 3/074 198/384 |
| 5,474,493 A * | 12/1995 | Tolbert | ............. | B65G 47/1457 198/392 |
| 5,702,030 A * | 12/1997 | Hulscher | ............. | B23P 19/002 198/389 |
| 5,954,185 A * | 9/1999 | Eshelman | ............. | B65G 47/1464 198/395 |
| 6,691,855 B1 * | 2/2004 | Takahashi | ............. | B65G 47/1407 198/396 |
| 6,846,134 B1 * | 1/2005 | Galletti | ............. | B65G 53/48 406/141 |
| 6,968,936 B2 | 11/2005 | Charpentier | | |
| 7,353,936 B2 * | 4/2008 | Berry | ............. | B23Q 11/0057 198/518 |
| 7,553,110 B2 * | 6/2009 | Minami | ............. | B65G 47/1421 198/391 |
| 7,815,033 B2 * | 10/2010 | Feierabend | ............. | B65G 47/1478 198/389 |
| 8,074,782 B2 * | 12/2011 | Charpentier | ............. | B29C 49/4205 198/396 |
| 8,701,865 B2 * | 4/2014 | Forni | ............. | B65G 11/203 198/384 |
| 8,727,098 B2 * | 5/2014 | Herzog | ............. | B65G 47/1457 198/392 |
| 8,985,308 B2 | 3/2015 | Stoiber et al. | | |
| 9,352,507 B2 * | 5/2016 | Heller | ............. | B65G 47/256 |
| 9,701,057 B2 | 7/2017 | Heller et al. | | |
| 2003/0221936 A1 * | 12/2003 | Aoyama | ............. | B65G 47/1421 198/395 |
| 2006/0243561 A1 * | 11/2006 | Perreault | ............. | B65G 47/1464 198/392 |
| 2007/0012546 A1 * | 1/2007 | Herzog | ............. | B65G 47/1457 198/392 |
| 2009/0095598 A1 * | 4/2009 | Stoiber | ............. | B29C 49/4205 198/617 |
| 2009/0308714 A1 * | 12/2009 | Charpentier | ............. | B29C 49/4205 198/392 |
| 2013/0001044 A1 * | 1/2013 | Ronchi | ............. | B65G 47/1457 198/395 |
| 2014/0138209 A1 * | 5/2014 | Buchhauser | ............. | B67B 3/06 198/347.1 |

FOREIGN PATENT DOCUMENTS

| | | |
|---|---|---|
| EP | 2 554 356 A1 | 2/2013 |
| WO | 00/23254 A1 | 4/2000 |
| WO | 02/36466 A1 | 5/2002 |
| WO | 2013/185930 A1 | 12/2013 |

\* cited by examiner

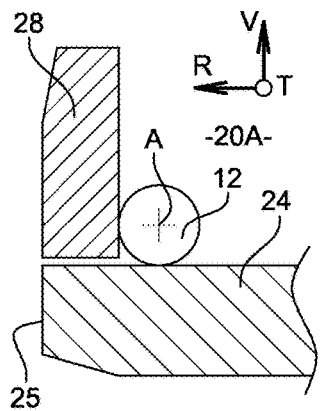
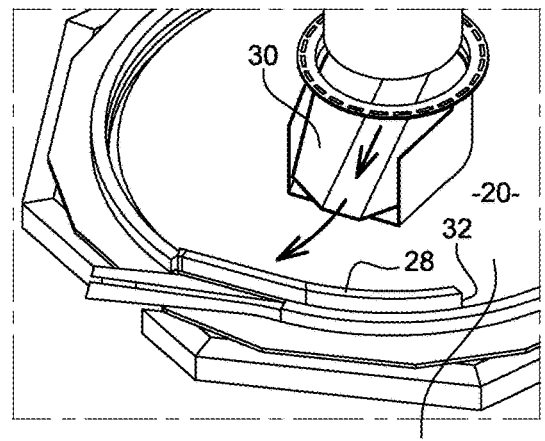
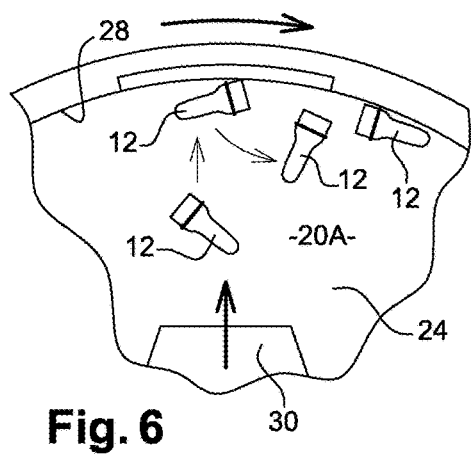
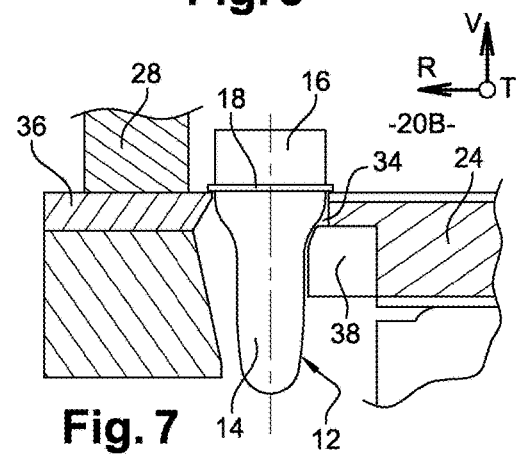
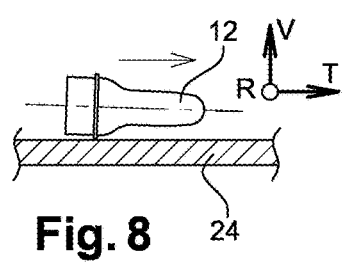
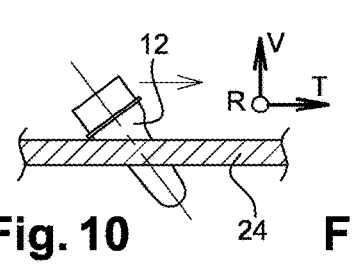
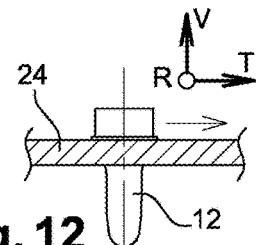
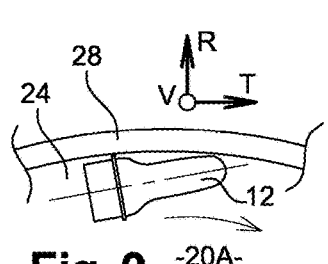
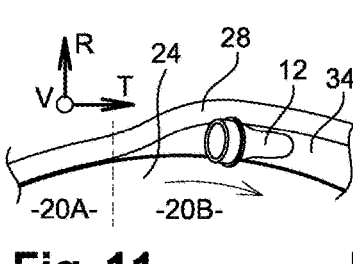
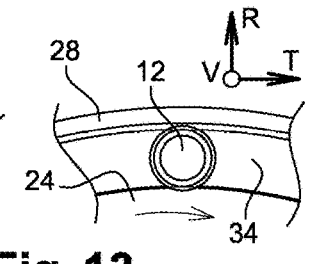

DEVICE FOR ALIGNING AND RIGHTING PREFORMS, COMPRISING A BOWL CENTRIFUGE EQUIPPED WITH MEANS FOR EJECTING MISALIGNED PREFORMS

TECHNICAL FIELD OF THE INVENTION

The invention relates to a device for aligning in a row and righting preforms, with the device being intended to be applied to axisymmetrical preforms having necks that are separated from bodies by annular support faces, with the device comprising a centrifuge bowl formed by:
- A horizontal circular platen that rotates around a vertical axis;
- A stationary peripheral railing;
- At least a first angular sector for aligning preforms against the railing;
- At least a second angular sector for righting preforms that is arranged downstream from said first angular sector, and along which the bowl has a peripheral gap for making it possible to right aligned preforms supported by their support face, with the body hanging outside of the bowl through said gap while the neck remains inside the bowl;
- At least one exit passage arranged downstream from said angular righting sector in the direction of rotation of the platen.

TECHNICAL BACKGROUND OF THE INVENTION

The device is intended to be used in an installation for manufacturing containers made of thermoplastic material and in particular polyethylene terephthalate (PET) by forming, in particular by blow molding or stretch blow molding, preforms. Such an installation makes it possible to produce containers on a very large scale at very high rates, for example greater than 85,000 bottles per hour.

According to a well-known technique, such containers are produced in two main steps. In a first step, molding is initiated by injection of a preform made of PET. This preform comprises an essentially tubular body that is closed at one of its axial ends, the opposite end being open by means of a neck. The neck has, right from this injection-molding operation, the definitive shape of the neck of the container. Generally, the neck of the container comprises a threading.

The preform generally comprises an annular support face that projects radially toward the outside relative to the rest of the body and that is oriented axially toward the closed end of the body. Such a support face is carried by, for example, an annular support collar that extends radially projecting toward the outside relative to the rest of the preform and that is arranged at the base of the neck.

There are installations in which the preforms, once injected, are directly passed on to the forming station, with each preform being transported individually.

However, in numerous cases, the preforms are manufactured by injection at a first location and are molded by blow molding to the definitive shape of the container at a second location in a specific manufacturing installation. Such a technology makes it possible to initiate the molding operation by blow molding as close as possible to the bottling site, with the injection operation able to be carried out at any location. Actually, it is relatively easy and inexpensive to transport preforms of reduced size, while transporting containers after blow molding has the drawback of being economically inefficient because of their very significant volume.

In the case where the injection station and the installation for manufacturing by forming are two totally independent machines, the preforms are generally delivered in bulk. The blow-molding station therefore uses a device for feeding preforms that is equipped with a device for aligning in a row and righting preforms. This invention relates to such a device.

An aligning and righting device comprising a centrifuge bowl was already proposed. The preforms are thrown in bulk onto a rotating platen that forms the bottom of the bowl. The preforms are then thrown off by the centrifugal force against a peripheral railing. A vertical space reserved between the railing and the rotating platen makes possible the passage of the bodies of the preforms while holding them by their collars. The preforms are thus aligned on the periphery of the bowl, with their main axis having an orientation that is essentially radial under the effect of the centrifugal force. The preforms thus have an axis that extends essentially orthogonally both in the direction of the gravity and the direction of movement of the preforms.

The preforms that are thus aligned and oriented in a similar manner are then driven toward a tangential outlet of the bowl under the effect of the movement of rotation of the rotating platen.

In this type of device, certain preforms are poorly aligned and even not aligned, with these two types of preforms being referred to below as non-aligned preforms. To make it possible to sort the non-aligned preforms from the correctly-aligned preforms, the known device comprises sorting means that are arranged upstream from a point of righting correctly-aligned preforms.

These sorting means consist of a deflector that allows the passage of correctly-aligned preforms toward an outlet of the centrifuge bowl while the non-aligned preforms are oriented in such a way as to go around the bowl again in hoping that they will be correctly aligned in their subsequent passage in the area of the sorting means.

However, the non-aligned preforms are not actively expelled from the row of correctly-aligned preforms. A blocking of a non-aligned preform across the row of correctly-aligned preforms can thus occur, thus causing a jam-up.

In addition, certain preforms are incorrectly aligned because they are nested together. The fact of distributing such nested preforms for going around again will not make it possible to disengage them. They will thus encumber the centrifuge bowl until they are manually expelled.

BRIEF SUMMARY OF THE INVENTION

The invention proposes a device of the type described above, characterized in that the device comprises means for actively ejecting incorrectly-aligned preforms from the row of correctly-aligned and righted preforms.

According to other characteristics of the device:
- The active ejection means comprise a pallet wheel that is arranged to rotate in the bowl above the rotating platen around a stationary axis, with the space swept by the pallets preventing the necks of the correctly-aligned preforms from going through;
- Each pallet sweeps at least one space that is located above the rotating platen at a vertical distance that is smaller than a minimum diameter of the body of the preform and at a radial edge distance of the rotating platen that is smaller than said minimum diameter of the preform to eject the preforms that are incorrectly aligned overall in the direction of the center of the rotating platen;

Each pallet sweeps a space that extends vertically above the gap at a distance that is essentially equal to the height of the neck of a preform that is intended to be aligned correctly;

Each pallet has a cutaway corresponding to the size of a preform neck that is intended to be aligned correctly;

The axis of rotation of the wheel is essentially vertical;

The device comprises at least one stationary deflector that is arranged above the rotating platen at a distance that is smaller than the minimum diameter of the body of a preform and that extends to downstream from the outlet by coming close to the center of the rotating platen in the direction of rotation of the rotating platen;

The device comprises a first pallet wheel that is arranged directly upstream from the deflector;

The device comprises a second pallet wheel that is interposed between the deflector and the exit passage in the direction of rotation of the rotating platen;

The first pallet wheel is arranged downstream from the angular righting sector.

BRIEF DESCRIPTION OF THE FIGURES

Other characteristics and advantages of the invention will emerge during the reading of the detailed description that follows for the understanding of which reference will be made to the accompanying drawings in which:

FIG. 4 is a radial cutaway view of an aligning sector of the centrifuge bowl of FIG. 1, which shows the peripheral railing and the rotating platen of the centrifuge bowl as well as an aligned preform;

FIG. 5 is a perspective view that shows a spillway of the device of FIG. 1;

FIG. 6 is a top view that shows a portion of the aligning sector of the centrifuge bowl, as well as the various steps in the travel of a preform discharged into the centrifuge bowl;

FIG. 7 is a radial cutaway view of a righting sector of the centrifuge bowl of FIG. 1, which shows the peripheral railing and the rotating platen of the centrifuge bowl as well as an aligned and righted preform;

FIG. 8 is a diagrammatic view in a radial direction that shows a preform that is aligned along the railing in the aligning sector of the centrifuge bowl of FIG. 1;

FIG. 9 is a top view of FIG. 8;

FIG. 10 is a view that is similar to the one of FIG. 8 that shows the preform of FIG. 8 during righting at the beginning of the righting sector of the centrifuge bowl of FIG. 1;

FIG. 11 is a top view of FIG. 10;

FIG. 12 is a view that is similar to the one of FIG. 10 that shows the preform of FIG. 10 righted in the righting sector of the centrifuge bowl of FIG. 1;

FIG. 13 is a top view of FIG. 12;

DETAILED DESCRIPTION OF THE FIGURES

Hereinafter, elements that have an identical structure or analogous functions will be referred to by the same references.

Hereinafter, the following local orientations will be adopted in a non-limiting manner for each preform that is present in the centrifuge bowl of the device:

Radial "R" directed from the inside to the outside from the axis of rotation of the rotating platen;

Tangential "T" that is orthogonal to the radial direction "R" and that extends in the plane of the rotating platen, directed from upstream to downstream in the direction of rotation of the rotating platen;

Vertical "V" directed from bottom to top in the reverse direction of Earth's gravity.

Figure 1:
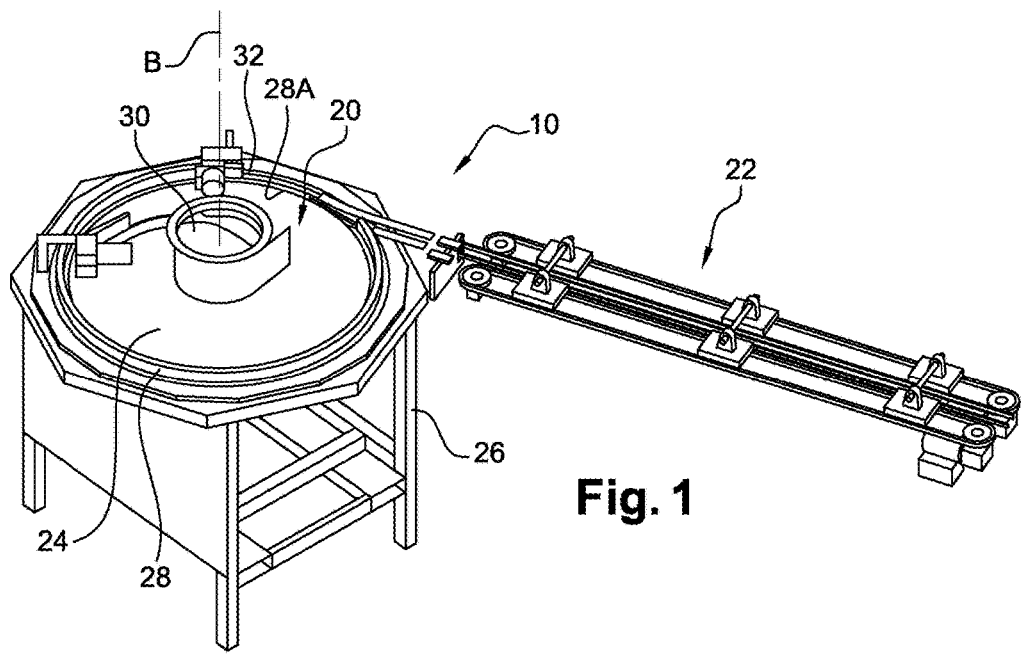
FIG. 1 is a perspective view that diagrammatically shows a device for aligning and righting preforms comprising a centrifuge bowl in accordance with the teachings of the invention.

A device 10 for aligning in a row and righting preforms 12 intended to be part of an installation (not shown) for manufacturing containers made of thermoplastic material by forming, in particular by blow molding or by stretch blow molding, was shown in FIG. 1.

Figure 2:
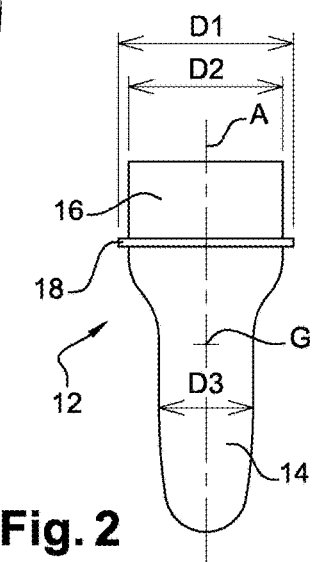
FIG. 2 is a front view that shows a preform that is suitable for being used with the device of FIG. 1, with the axis of the preform being oriented vertically here.

An example of the preform 12 that is intended to be used with the device 10 is illustrated in FIG. 2. Such a preform 12 is made of thermoplastic material, here made of PET. It is conventionally obtained by injection molding. It has an essentially axisymmetrical shape around a main axis "A" shown vertically in FIG. 2.

It comprises a body 14 in the shape of an elongated tube along the main axis "A" that has a closed axial end and that has an axially-open neck 16 at its opposite end, shown at the top in FIG. 2.

The preform 12 also comprises an annular support face 18 that is oriented axially toward the closed end of the preform 12, which projects radially relative to the rest of the body 14, and which is arranged above a center "G" of gravity of the preform 12. The term "annular" means that the support face goes around the preform 12 either in a continuous manner or in an intermittent manner. In the latter case, the annular face is formed by, for example, separate segments that go around the preform and that are nevertheless close enough so that the preform can be supported between two diametrically opposite supports regardless of the position of the preform around its main axis.

In the example shown, the base of the neck 16, at the junction with the body 14, has a collar that extends radially projecting relative to the rest of the preform 12. The lower face of the collar thus forms said support face 18.

As a variant, the collar can be arranged other than at the base of the neck, for example in the area of the rim.

According to another variant, the support face is formed by, for example, a lower face of a threading of the neck.

According to still another variant, the support face is connected to the preform, for example by means of a stopper.

The outer diameter "D1" of the support face 18, in this case of the collar, is thus larger than the maximum outer diameter "D2" of the body 14. In the example shown in FIG. 2, the closed end segment of the body 14 has here a minimum outer diameter "D3."

The neck 16 has its definitive shape, while the body 14 is intended to be stretched during a subsequent forming operation to form the body of the finished container.

In addition, the weight of the bodies 14 of the preforms 12 that are used is greater than the weight of the necks 16, including that of the collars. Thus, the center "G" of gravity of the preform 12 is located under the support face 18 with reference to FIG. 2. Thus, a preform 12 that is supported by its support face 18 resting on two diametrically opposite supports will be naturally oriented by gravity with the neck 16 at the top.

The example shown in FIG. 2 is non-limiting. It will be understood that the device 10 and the associated method are intended to be applied to all types of preforms 12 having support faces 18 radially projecting relative to the rest of the body 14 and having a center of gravity that is axially offset toward the body relative to said support face 18.

Returning to FIG. 1, the device 10 comprises primarily a centrifuge bowl 20 as well as a conveyor 22 for discharging aligned and righted preforms.

The centrifuge bowl 20 comprises a horizontal circular platen 24 that rotates around a central vertical axis "B." The rotating platen 24 thus has a circular outer edge 25 shown in FIG. 4. The upper face of the rotating platen 24 vertically delimits downward the inside of the centrifuge bowl 20. Thus, the platen 24 forms the bottom of the bowl 20.

The rotating platen 24 has an outer diameter that is much larger than the dimensions of the preforms 12.

The rotating platen 24 is driven in rotation at a constant speed, here in a clockwise direction in a top view, for example by a motor (not shown) that is arranged below the rotating platen 24. The speed of rotation is, for example, controlled in such a way that the outer edge 25 of the rotating platen 24 moves between 2 and 3 m/s.

The rotating platen 24 is carried here by a support table 26. The support table 26 has feet that are advantageously adjustable in height to make it possible to adjust the plate of the rotating platen 24.

The centrifuge bowl 20 is delimited radially toward the outside by a stationary peripheral railing 28, which is attached here to the support table 26. The first function of this railing 28 is in particular to hold the preforms thrown off toward the outside by the centrifugal force that is produced by the rotation of the rotating platen 24, while its second function is to guide the movement of the preforms 12 to an exit passage 32 of the bowl 20.

The preforms 12 are intended to be discharged in bulk onto the rotating platen 24 by means of a stationary spillway 30. The spillway 30 is arranged here in the center of the rotating platen 24. The spillway 30 is designed to discharge the preforms 12 in bulk, radially in the direction of a first portion 28A for receiving the railing 28. The spillway 30 here comes in the form of a toboggan fed by preforms 12 at the top by means of a lifting belt (not shown). The top of the spillway 30 nevertheless has a relatively small height, for example approximately 40 cm above the platen 24.

Figure 3:
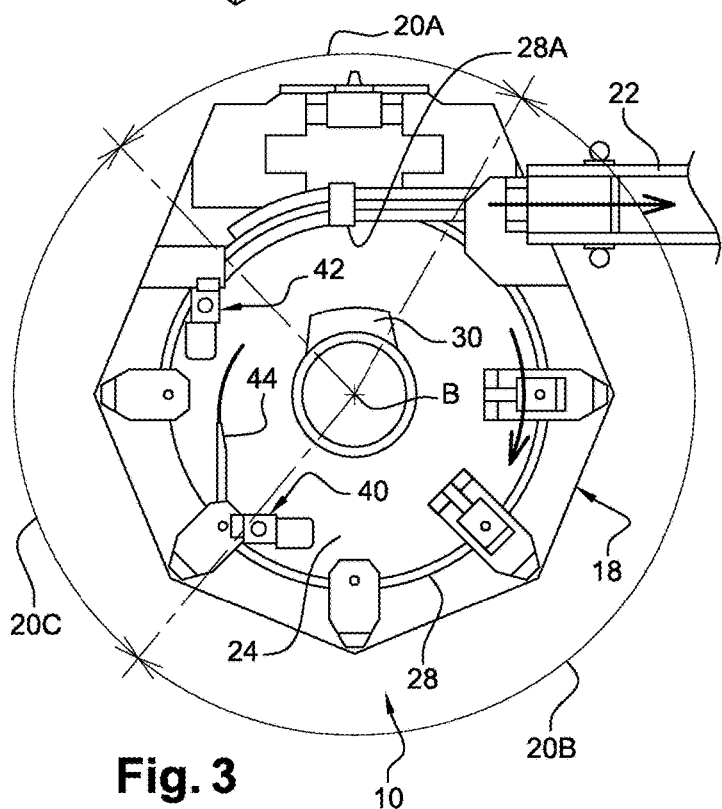
FIG. 3 is a top view that shows the centrifuge bowl of FIG. 1.

As is illustrated in FIG. 3, for the requirements of the description, the bowl will be divided into three stationary zones relative to the table 26, each formed by an angular sector that extends around the axis "B" of the rotating platen 24.

A first angular sector 20A, a so-called preform aligning sector 12, extends facing the outlet of the spillway 30. This angular aligning sector 20A includes the portion 28A for receiving the railing 28.

A second angular sector 20B for righting aligned preforms 12 is arranged directly downstream from the first angular aligning sector 20A. In a non-limiting manner, it extends overall to 180° here.

A third angular sector 20C for sorting incorrectly-aligned preforms is arranged directly downstream from the second angular righting sector 20B and directly upstream from the first angular aligning sector 20A. At the downstream end of this sorting sector 20C, the exit passage 32 of the preforms 12 is open in the railing 28 to make it possible to guide the correctly-aligned and righted preforms 12 to the conveyor 22. The conveyor 22 passes here behind the portion 28A for receiving the railing 28.

The name of each of these sectors 20A, 20B, 20C provides an indication of their function. It will be understood by the following that non-aligned preforms 12 in the area of the first angular sector 20A can nevertheless be aligned and righted in the area of the second angular sector 20B depending on the circumstances.

Over the entire periphery of the first angular aligning sector 20A, operational play is reserved between the railing 28 and the rotating platen 24. This play makes possible the rotation of the rotating platen 24, but it is, however, slight enough to make it possible for the railing 28 to keep the entire preform 12 inside the bowl 20. This play is thus less than the minimum diameter "D3" of the body 14 of the preform 12.

As shown in FIG. 4, in this aligning sector 20A, the railing 28 extends vertically above the rotating platen 24 in such a way that the outer edge 25 of the rotating platen 24 is arranged outside of the centrifuge bowl 20.

During the operation of the device 10, as shown in FIGS. 5 and 6, during a first step of discharging, the preforms 12 that are discharged in bulk via the spillway 30 are thrown off radially against a portion 28A for receiving the railing 28 under the combined effect of their radial sliding speed at the exit of the spillway 30 and the centrifugal force that is produced by the rotation of the rotating platen 24. At the same time, the rotating platen 24 also begins to drive in its rotation the preforms 12 tangentially downstream.

During a second aligning step, the preforms 12 are held in the inside of the bowl 20 by the railing 28, and then, after one or more rebounds against the railing 28, the preforms 12 gradually lose speed in the radial direction. They are then constantly held radially against the railing by the centrifugal force. FIG. 6 shows the path followed by the same preform 12 from its arrival via the spillway 30 to its stable position against the railing 28. The preforms 12 are then driven in purely tangential movement in a clockwise direction by the rotating platen 24 along the railing 28.

In this configuration, the preforms 12 naturally occupy the most stable position in which their main axis "A" is oriented in a tangent direction relative to the rotating platen 24.

Most of the preforms 12 that are present in the angular aligning sector 20A of the bowl 20 are thus aligned tangentially against the railing 28, with their main axis "A" being oriented essentially tangentially to their direction of movement. The tangential separation between two successive aligned preforms 12 is random, because the rotating platen 24 is perfectly flat and does not have indexing notches of the preforms 12. The preforms 12 can thus be in contact by their ends under the effect of the centrifugal force that makes it necessary for the preforms 12 to slide relative to one another. The preforms 12 thus occupy in an optimal manner the entire peripheral length of the bowl 20.

At this stage, the preforms 12 are oriented randomly with their necks upstream or downstream, with no impact on the rest of the method. The thus aligned preforms 12 continue their peripheral movement in the righting sector 20B.

The fact that the preforms 12 are held on the rotating platen 24 makes it possible to keep them flattened radially against the railing 28. Thus, the preforms 12 are guided in a stable manner by the railing 28 during their movement around the bowl 20.

As shown in FIG. 7, in the second angular righting sector 20B of the centrifuge bowl 20, the bowl 20 has a peripheral gap 34 that is formed by radial separation of the railing 28 relative to the outer edge 25 of the rotating platen 24. The radial width of the gap 34 is between the maximum diameter "D2" of the body 14 and the diameter "D1" of the support face 18, in this case of the collar. This gap 34 extends to the exit passage 32 of the preforms 12.

At least along the second righting sector 20B, the railing 28 has a support rail 36 of the support face 18. The rail 36 extends radially projecting toward the inside in the same area as the upper face of the rotating platen 24 to delimit the gap 34 toward the outside. The rail 36 extends here to the exit passage 32.

Thus, the preforms 12 are able to be supported by their support faces 18, in this case by their collars, which rest on two diametrically opposite points on the horizontal upper face of the rotating platen 24, on the one hand, and on a horizontal upper face of the rail 36, on the other hand, with the bodies 14 of the preforms 12 hanging under the area of the rotating platen 24 through said gap 34. The two support points are aligned radially. The rail 36 makes it possible to support the preforms 12 in a stable manner.

Thus, during a third righting step, as shown in FIGS. 8 and 9, the preforms 12 that are aligned during the second step arrive from the first aligning sector 20A by being aligned in a row along the railing 28, with their main axis "A" oriented tangentially. The aligned preforms 12 are placed randomly with neck 16 upstream or neck 16 downstream without this having an influence on their righting.

When the body 14 of each preform 12 arrives above the gap 34, the body 14 begins to fall, as shown in FIGS. 10 and 11, thus making the preform 12 tilt around a radial axis that passes through the support points of the support face 18, in this case of the collar, of the preform. The tilting continues until the main axis "A" of the preform 12 is vertical, optionally after some balancing around the radial axis. The preform 12 is then supported by its support face 18 resting jointly on the rail 36 and on the rotating platen 24, as indicated in FIGS. 12 and 13. The preform 12 is thus righted, neck 16 at the top. A preform 12 that is thus righted is guided on the outside by the rail 36 of the railing 28, and it is guided on the inside by the peripheral edge 25 of the rotating platen 24.

During the tilting, the main axis "A" of the preform 12 remains in a vertical plane that is tangent to the movement. Because of the tilting of the main axis "A" in the direction of movement of the preforms 12, the support face 18 of each preform 12 remains in permanent contact with the rotating platen 24, on the one hand, and with the rail 36, on the other hand, by its two support points. Thus, each preform 12 is guided in a stable and effective manner during its righting.

As shown in FIG. 11, a transition zone is provided at the end upstream from the angular righting sector 20B. In this transition zone, the gap 34 is gradually widened until its final width is reached. To do this, the railing 28 gradually moves away from the axis "B" of rotation of the rotating platen 24. This makes it possible for the aligned preforms 12 to remain constantly in contact with the railing 28 under the effect of the centrifugal force. The preforms 12 are thus guided in a stable manner in the aligned position even during their righting.

If there were a gap in the railing 28, it could no longer perform its role as guide in the area of this gap. The correctly-aligned preforms 12 would then run the risk of bouncing off and of winding up poorly positioned, leaning, for example, against the adjacent preforms and preventing their righting.

The thus righted preforms 12 are driven in rotation around their main axis by friction against the outer edge 25 of the peripheral platen 24. The preforms 12 are thus moved around the bowl 20 in the direction of rotation of the rotating platen 24 by rolling against the peripheral railing 28.

To improve this rolling phenomenon of the preforms 12 and thus to increase the speed of advance of the preforms 12 around the platen 24, the outer edge 25 of the rotating platen 24 advantageously comprises a tread 38 that has a suitable friction coefficient for allowing the body 14 of the preform 12 to roll against the tread 38 without sliding. Such an arrangement is shown in, for example, FIG. 7.

As a variant of the invention that is not shown and that can replace the arrangement of FIG. 7 or be combined with this same arrangement, the railing is equipped with a similar tread that is intended to come into contact with the bodies of righted preforms.

The righted and aligned preforms 12 are thus directed toward the third sorting sector 20C, in which the poorly-aligned preforms 12N are sent back directly toward the first aligning sector 20A by various sorting means, such as separator wheels 40, 42 and a deflector 44.

The sorting means make it possible to actively eject incorrectly-aligned preforms 12N toward the angular aligning sector 20A so as to make possible their direct return into the flow of preforms that are arriving in bulk via the spillway 30. The adverb "actively" means that the sorting means are able to provide momentum to the non-aligned preforms 12N to return quickly toward the first angular sector 20A.

The incorrectly-aligned preforms 12N can be non-aligned preforms 12N. A non-aligned preform 12N is a preform lying on the rotating platen 24 and supported radially against the necks 16 of the correctly-aligned and righted preforms 12. These non-aligned preforms 12N thus have at least one part radially projecting toward the center of the rotating platen 24 relative to the necks 16 of the correctly-aligned preforms 12.

An incorrectly-aligned preform 12N can also be a preform 12N that is nested into a correctly-aligned preform 12 that thus travels among the correctly-aligned preforms 12.

Figure 14:
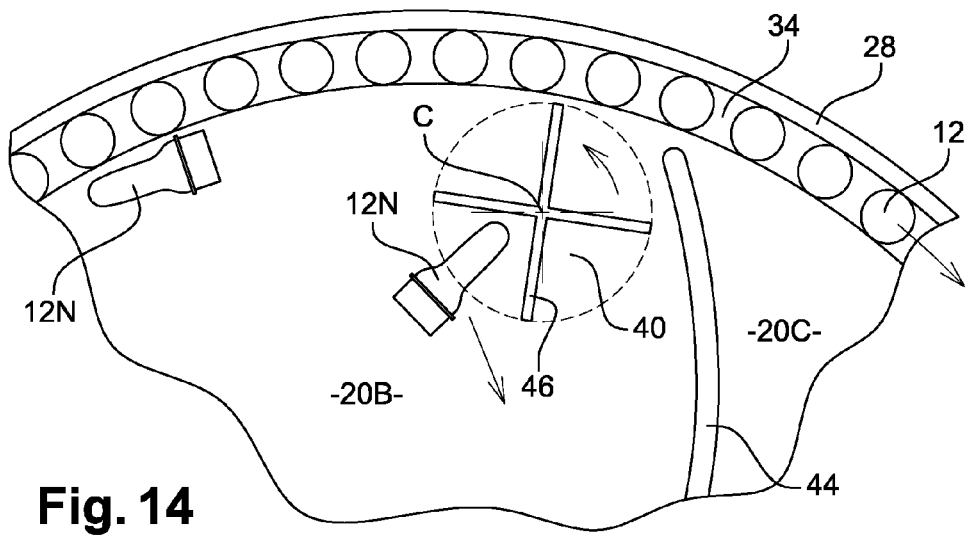
FIG. 14 is a top view that shows a zone of the centrifuge bowl of FIG. 1 that is located astride the righting sector and a sorting sector and that comprises a primary separator wheel in the process of separating out a poorly-aligned preform.

As shown in more detail in FIG. 14, the first sorting means are thus formed by a first wheel 40 with pallets 46 called "main separator wheel," which is arranged rotating in the bowl 20, above the rotating platen 24 around a stationary axis "C." It is a matter here of a vertical axis "C." The space swept by the pallets 46 is thus cylindrical with a vertical axis "C." The main separator wheel 40 is arranged at an end that is upstream from the third angular sorting sector 20C.

This arrangement of the main separator wheel 40 downstream from the angular righting sector 20B of the preforms 12 makes it possible to ensure that the aligned preforms 12 will not be disturbed by the separator wheel 40. Actually, before their righting, the aligned preforms 12 are guided on the outside by the railing, but they are not guided on the inside. Only the centrifugal force makes it possible to keep them aligned. As a result, if an ejected preform 12N touched an aligned preform 12, it would run the risk of putting this preform 12 out of alignment.

Moreover, after their righting, the aligned and righted preforms 12 are guided on the inside by the peripheral edge 25 of the rotating platen 24. Thus, the aligned preforms 12 are not very likely to be misaligned by contact with an ejected preform 12N.

This main separator wheel 40 makes it possible to separate out the non-aligned preforms 12N that are always lying on the rotating platen 24. These non-aligned preforms 12N thus have at least one part that projects radially toward the center of the rotating platen 24 relative to the necks 16 of the correctly-aligned preforms 12.

The space swept by the pallets 46 was shown in dotted lines in the figures. The pallets 46 have a rectangular shape here. As a result, the swept space has a cylindrical rotational shape.

Figure 15:
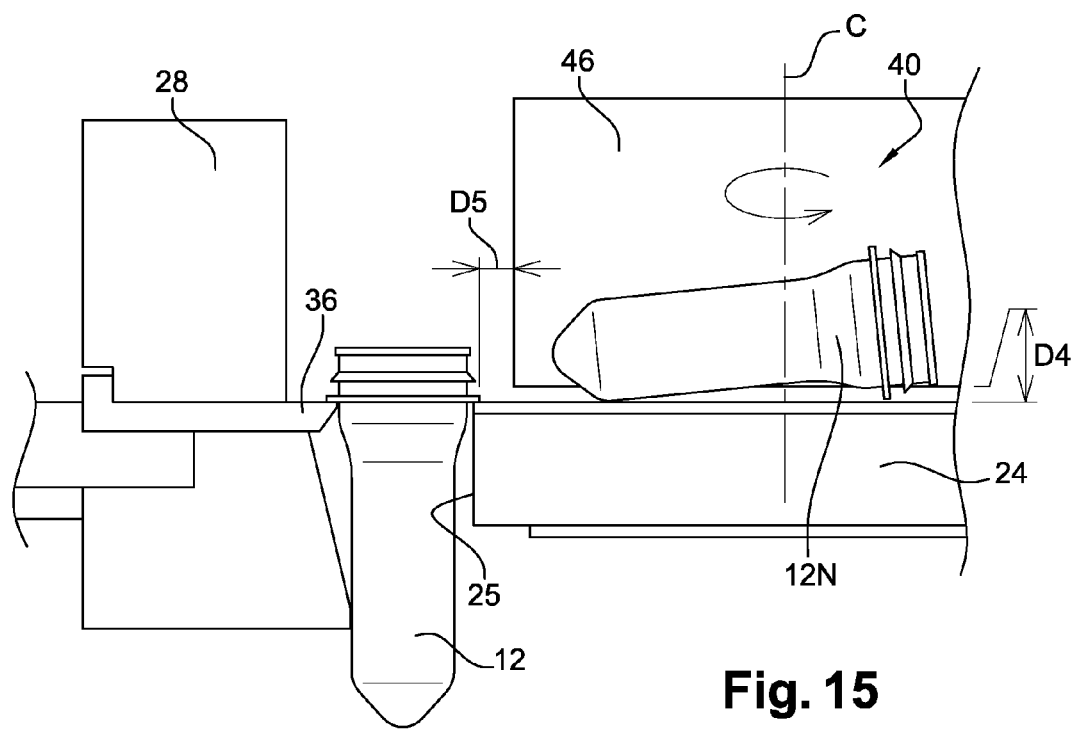
FIG. 15 is a radial cutaway view of the bowl that passes through the axis of rotation of the primary separator wheel that represents the primary separator wheel of FIG. 14.

The swept space prevents the necks 16 of the correctly-aligned preforms 12 from going through, with said passage extending above the gap 34. Moreover, each pallet 46 sweeps a space that is located above the rotating platen 24 at a vertical distance "D4" that is smaller than the minimum diameter "D3" of a preform 12 and at a radial edge distance "D5" 25 of the rotating platen 24 that is smaller than the minimum diameter "D3" of a preform 12 for ejecting the preforms 12N that are not aligned overall in the direction of the center of the rotating platen 24, as is shown in FIG. 15. For this purpose, the main separator wheel 40 rotates in the opposite direction relative to the rotating platen 24.

The sorting means also comprise a stationary deflector 44 that is arranged above the rotating platen 24 at a vertical distance that is smaller than that of the minimum diameter "D3" of the bodies 14 of the preforms 12 to guide the preforms 12N that are ejected by the main separator wheel 40 in the direction of the first angular sector 20A. Said non-aligned preforms 12N are guided by the deflector 44 until downstream from the exit passage 32 in the direction of rotation of the rotating platen 24. This makes it possible to prevent the non-aligned preforms 12N from being "blocked" in this third angular sorting sector 20C.

As is shown in FIG. 3, the deflector 44 thus extends from the outer edge 25 of the rotating platen 24, immediately downstream from the main separator wheel 40 in coming close in a spiral arm toward the center of the rotating platen 24 downstream from the exit passage 32. An interval is reserved radially between the downstream end of the deflector 44 and the spillway 30 to make possible the return of the preforms 12N ejected by the main separator wheel 40 toward the first angular aligning sector 20A.

The deflector 44 ensures that in the space delimited between the downstream face of the deflector 44 and the railing 28, no non-aligned preform 12N is laid on the rotating platen 24.

Figure 16:
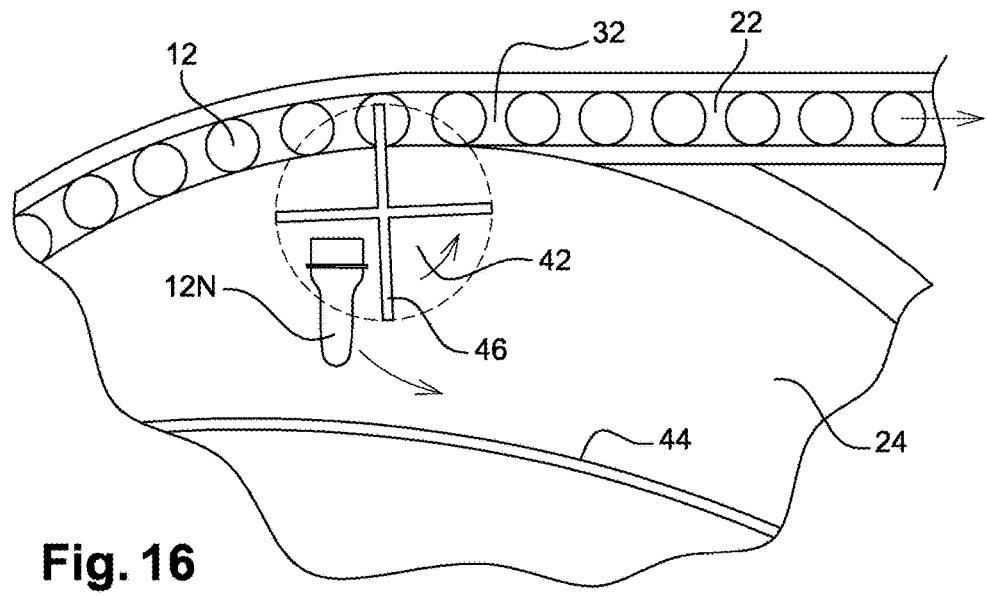
FIG. 16 is a top view that shows a portion downstream from the sorting sector of the centrifuge bowl of FIG. 1 and that comprises a secondary separator wheel in the process of separating out a poorly-aligned preform.

The sorting means also comprise a second wheel 42 with pallets 46, a so-called secondary separator wheel 42, which is interposed between the deflector 44 and the exit passage 32 in the direction of rotation of the rotating platen 24. In the embodiment shown in FIG. 16, the secondary separator wheel 42 is more particularly arranged directly upstream from the exit passage 32 in such a way that the ejected preforms 12N are thrown off directly against the portion 28A for receiving the railing 28 without running the risk of reaching the exit passage 32.

This second pallet wheel 42 is intended to eject the nested preforms 12N that travel with the correctly-aligned preforms 12 or optionally preforms 12N that rest on the necks 16 of the correctly-aligned preforms 12.

The secondary separator wheel 42 rotates here around a vertical axis "E." The space that is swept by the pallets 16 is thus cylindrical with axis "E." This swept space is shown in broken lines in the figures.

Each pallet 46 sweeps a space that extends vertically above the gap 34 at a vertical distance that is slightly greater than the height of a neck of preform 12. Thus, each pallet 46 passes vertically above and close to the neck of the correctly-aligned preforms 12, at a distance "D6" that is smaller than the height of the neck of a possible nested preform 12N.

Figure 17:
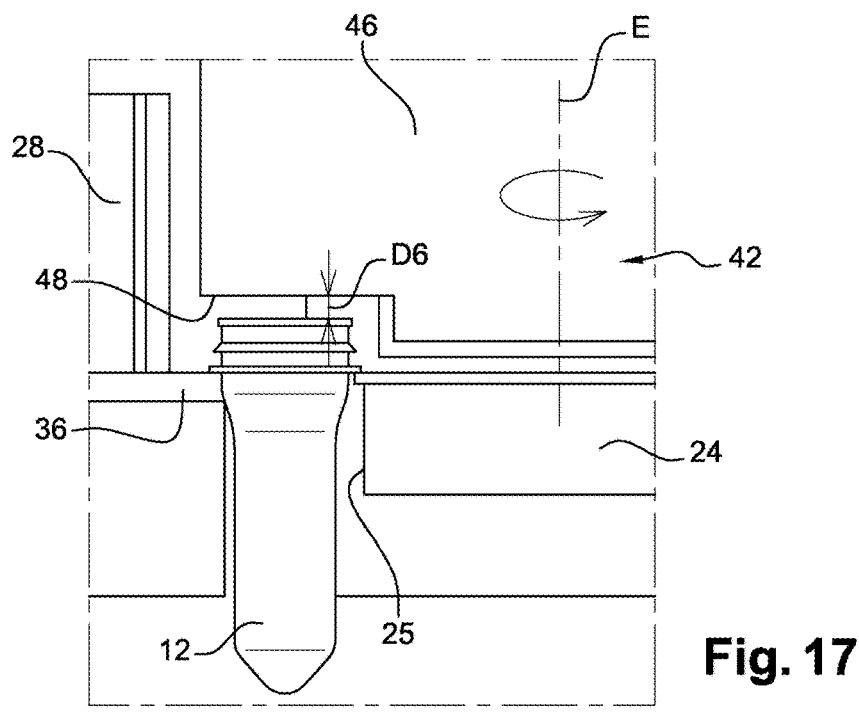
FIG. 17 is a radial cutaway view of the bowl that passes through the axis of rotation of the secondary separator wheel that represents the secondary separator wheel of FIG. 16.

Each pallet 46 has at its free end a cutaway 48 that corresponds to the size of a neck 16 of a preform 12 that is intended to be aligned correctly, as is illustrated in FIG. 17. Thus, the pallets 46 also sweep a space that is located close to the upper face of the rotating platen 24 like the first main separator wheel 40.

This makes it possible not only to eject the nested preforms 12N from the row of correctly-aligned preforms 12, but also to ensure that these preforms 12N will be ejected without the possibility of passing under the pallets 46. This makes it possible to prevent the ejected preforms 12N from returning in the direction of the exit passage 32.

As shown in the figures, the conveyor 22 is connected tangentially to the platen in the continuity of the exit passage 32 of the correctly-aligned and righted preforms 12. The conveyor 22 comprises a horizontal slide, formed by an outer rail that extends the rail 36 of the railing 28 and a parallel inner rail that tangentially extends the outer edge 25 of the rotating platen 24. The rails are separated in such a way as to support a righted preform 12 by its support face 18, in this case by its collar. This arrangement makes it possible to evacuate the righted preforms 12 in a row without ever ceasing to guide them.

The conveyor 22 comprises a blower device (not shown) that makes it possible to move the righted preforms 12. For this purpose, the blower device comprises several vents that blow air toward the preforms 12 to push them downstream.

As a variant, the conveyor can be equipped with any other known means for moving aligned and righted preforms.

The constant guiding of the preforms in all of the steps of the method and during the transition between each of the steps makes it possible to ensure that the preforms 12 will be moved in a stable manner. This makes it possible in particular to rotate the rotating platen 24 at high speed to increase the flow rate of the preforms 12 without running the risk of putting correctly-aligned preforms 12 out of alignment.

In addition, the preforms are not pushed by indexing elements. As a result, the preforms 12 move without running the risk of jamming and sticking.

The device according to the invention is able to be adapted easily to various models of preforms. All that actually has to be done is to replace railing segments 28 so as to adapt the width of the gap 34 to the size of the body 14 and the support face 18 of each model, as well as to replace the associated treads 38. Such segments are easy to manufacture and quick to change.

In addition, it is possible to change the second secondary separator wheel 42 to adapt the shape of the cutaway 38 to the dimensions of the neck of each model of preforms.

As a variant, when the models of preforms have slight variations in size of their necks, the second secondary separator wheel 42 does not need to be replaced.

The invention claimed is:

1. A device (10) for aligning in a row and righting preforms (12), with the device (10) being intended to be applied to axisymmetrical thermoplastic preforms (12) for blow molding containers, said preforms having necks (16) that are separated from bodies (14) by annular support faces (18) projecting relative to the body (14), the device (10) comprising:
a centrifuge bowl (20) that is formed by:
a horizontal circular platen (24) that rotates around a vertical axis (B), the platen having an outer edge (25),
wherein the platen has at least a first angular sector (20A) and a second angular section (20B) that is arranged downstream from said first angular sector (20A),
a stationary peripheral railing (28),
a peripheral gap (34) located within the second angular section (20B) of the platen at a radial separation of the peripheral railing (28) relative to the outer edge (25) of the platen (24), and
at least one exit passage (32) arranged downstream from said second angular sector (20B) of the platen in the direction of rotation of the platen (24),
the first angular sector (20A) of the platen for aligning the preforms (12) against the railing (28),
the second angular sector (20B) of the platen for righting the aligned preforms (12) at the peripheral gap (34) to have the righted aligned preforms (12) supported by their support face (18), with the body (14) of each righted aligned preform (12) hanging outside of the bowl (20) through said gap (34) while the neck (16) of each righted aligned preform (12) remains inside the bowl (20) and forms part of a row of correctly-aligned and righted preforms (12), and
at least one exit passage (32) arranged downstream from said second angular sector (20B) in the direction of rotation of the platen (24), the at least one exit passage (32) accepting the row of correctly-aligned and righted preforms (12); and
an ejector mechanism structured for actively ejecting incorrectly-aligned preforms (12N) from the row of correctly-aligned and righted preforms (12).

2. The device (10) according to claim 1, wherein the active ejector mechanism comprises at least a first wheel (40, 42) with pallets (46) that is arranged to rotate in the bowl (20) above the rotating platen (24) around a stationary axis (C, E), a space swept by the pallets (46) extending outside of a volume through which the necks (16) of the correctly-aligned preforms (12) go.

3. The device (10) according to claim 2, being intended to be applied to the axisymmetrical preforms (12), each of the preforms having an outside diameter of the preform body, the preforms to which the device is applied having body outside diameters that are greater or equal to a minimum outside diameter of the body of the preforms, wherein at least one of the pallets (46) sweeps at least one space that is located above the rotating platen (24) at a vertical distance (D4) that is smaller than said minimum outside diameter of the body (14) of the preforms (12) and at a radial edge distance (D5) of the rotating platen (24) that is smaller than said minimum outside diameter of the body of the preforms (12) to eject the preforms (12N) that are incorrectly aligned overall in the direction of the center of the rotating platen (24).

4. The device (10) according to claim 3, wherein each pallet (46) sweeps a space that extends vertically above the gap (34) at a distance that is essentially equal to the height of the neck (16) of a preform (12) that is intended to be aligned correctly.

5. The device (10) according to claim 4, wherein each pallet (46) has a cutaway (48) design for simultaneously:
i) preventing a neck of a correctly aligned preform in the gap from interfering with a space swept by the pallet, and
ii) allowing the pallet to sweep a volume extending above the platen and below the height of said neck.

6. The device according to claim 2, wherein the axis (C, E) of rotation of the first wheel (40, 42) is essentially vertical.

7. The device according to claim 3, further comprising at least one stationary deflector (44) that is arranged above the rotating platen (24) at a distance that is smaller than the minimum diameter of the body (14) of a preform (12) and that extends to downstream from the outlet by coming close to the center of the rotating platen (24) in the direction of rotation of the rotating platen (24).

8. The device according to claim 7, the first wheel (40) with pallets (46) is arranged directly upstream from the deflector (44).

9. The device according to claim 8, wherein each pallet (46) of the first wheel has a cutaway (48) design for simultaneously preventing a neck of a correctly aligned preform from interfering with a space swept by the pallet, and allowing the pallet to sweep a volume extending above the platen and below the height of said neck, and the active ejector mechanism further comprising a second wheel (42) with pallets (46) that is interposed between the deflector (44) and the exit passage (32) in the direction of rotation of the rotating platen.

10. The device according to claim 8, wherein the first wheel (40) with pallets (46) is arranged downstream from the angular righting sector (20B).

11. The device (10) according to claim 2, wherein each pallet (46) sweeps a space that extends vertically above the gap (34) at a distance that is essentially equal to the height of the neck (16) of a preform (12) that is intended to be aligned correctly.

12. The device according to claim 3, wherein the axis (C, E) of rotation of the first wheel (40, 42) is essentially vertical.

13. The device according to claim 4, wherein the axis (C, E) of rotation of the first wheel (40, 42) is essentially vertical.

14. The device according to claim 1, further comprising at least one stationary deflector (44) that is arranged above the rotating platen (24) at a distance that is smaller than the minimum diameter of the body (14) of a preform (12) and that extends to downstream from the outlet by coming close to the center of the rotating platen (24) in the direction of rotation of the rotating platen (24).

15. The device according to claim 2, further comprising at least one stationary deflector (44) that is arranged above the rotating platen (24) at a distance that is smaller than the minimum diameter of the body (14) of a preform (12) and that extends to downstream from the outlet by coming close to the center of the rotating platen (24) in the direction of rotation of the rotating platen (24).

16. The device according to claim 4, further comprising at least one stationary deflector (44) that is arranged above the rotating platen (24) at a distance that is smaller than the minimum diameter of the body (14) of a preform (12) and that extends to downstream from the outlet by coming close to the center of the rotating platen (24) in the direction of rotation of the rotating platen (24).

17. The device according to claim 5, further comprising at least one stationary deflector (44) that is arranged above the rotating platen (24) at a distance that is smaller than the minimum diameter of the body (14) of a preform (12) and that extends to downstream from the outlet by coming close to the center of the rotating platen (24) in the direction of rotation of the rotating platen (24).

18. The device according to claim 6, further comprising at least one stationary deflector (44) that is arranged above the rotating platen (24) at a distance that is smaller than the minimum diameter of the body (14) of a preform (12) and that extends to downstream from the outlet by coming close to the center of the rotating platen (24) in the direction of rotation of the rotating platen (24).

19. The device according to claim 9, wherein the first wheel (40) with pallets (46) is arranged downstream from the angular righting sector (20B).

20. The device according to claim 2, wherein at least one pallet is located to hit preform bodies lying on the platen and moving toward the space swept by the ejector mechanism.

* * * * *